US008364465B2

(12) United States Patent
Miyamoto et al.

(10) Patent No.: US 8,364,465 B2
(45) Date of Patent: *Jan. 29, 2013

(54) OPTIMIZING A LANGUAGE/MEDIA TRANSLATION MAP

(75) Inventors: Kohtaroh Miyamoto, Tokyo (JP); Ali Sobhi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,537

(22) Filed: Mar. 19, 2012

(65) Prior Publication Data

US 2012/0179451 A1    Jul. 12, 2012

Related U.S. Application Data

(63) Continuation of application No. 12/567,162, filed on Sep. 25, 2009.

(51) Int. Cl.
*G06F 17/28* (2006.01)
(52) U.S. Cl. .......................................................... 704/2
(58) Field of Classification Search .................. 704/2, 3, 704/4, 8
See application file for complete search history.

(56) References Cited

U.S. PATENT DOCUMENTS

| | | | |
|---|---|---|---|
| 7,369,984 B2 | 5/2008 | Fairweather et al. | |
| 7,496,496 B2 | 2/2009 | Quirk et al. | |
| 7,529,658 B2 | 5/2009 | Bulusu et al. | |
| 2002/0165708 A1* | 11/2002 | Kumhyr | 704/8 |
| 2002/0169592 A1* | 11/2002 | Aityan | 704/2 |
| 2003/0110023 A1* | 6/2003 | Bangalore et al. | 704/5 |
| 2003/0115059 A1 | 6/2003 | Jayaratne | |
| 2003/0176995 A1* | 9/2003 | Sukehiro | 704/2 |
| 2004/0102201 A1* | 5/2004 | Levin | 455/466 |
| 2005/0021322 A1* | 1/2005 | Richardson et al. | 704/2 |
| 2005/0246156 A1* | 11/2005 | Scanlan | 704/2 |
| 2006/0080079 A1* | 4/2006 | Yamabana | 704/2 |
| 2006/0116865 A1* | 6/2006 | Cheng et al. | 704/2 |
| 2007/0294076 A1* | 12/2007 | Shore et al. | 704/2 |
| 2008/0040111 A1* | 2/2008 | Miyamoto et al. | 704/240 |
| 2008/0077384 A1* | 3/2008 | Agapi et al. | 704/2 |
| 2008/0133245 A1 | 6/2008 | Proulx et al. | |
| 2008/0263132 A1* | 10/2008 | Saintloth | 709/203 |

(Continued)

FOREIGN PATENT DOCUMENTS

WO    WO2008/007386 A1    1/2008

OTHER PUBLICATIONS

U.S. Appl. No. 12/567,162.

(Continued)

*Primary Examiner* — Jialong He
(74) *Attorney, Agent, or Firm* — Francis Lammes; Stephen J. Walder, Jr.; Eustus D. Nelson

(57) ABSTRACT

A mechanism is provided for optimizing a language/media translation map. A user input is received comprising an input language/media selection, one or more output languages/medias selections, and a threshold for at least one of accuracy or throughput of one or more requested language/media translations. For each of the one or more requested language media translations, a determination is made as to whether an accuracy or throughput of a selected one of an automated translation system or a human resource translator is above the threshold for the at least one of accuracy or throughput. Responsive to the accuracy or throughput being above the threshold, either the selected one of the automated translation system or the selected one of the human resource translator is added to a multiple language/media translation map. An optimized multiple language/media translation map is then generated for use by a translation orchestration module in the data processing system.

7 Claims, 9 Drawing Sheets

U.S. PATENT DOCUMENTS

| | | | |
|---|---|---|---|
| 2008/0270134 A1* | 10/2008 | Miyamoto et al. | 704/251 |
| 2009/0083023 A1 | 3/2009 | Foster et al. | |
| 2009/0083243 A1 | 3/2009 | Heymans et al. | |
| 2009/0119091 A1* | 5/2009 | Sarig | 704/2 |
| 2009/0132230 A1 | 5/2009 | Kanevsky et al. | |
| 2009/0241115 A1* | 9/2009 | Raffo et al. | 718/100 |
| 2009/0326913 A1* | 12/2009 | Simard et al. | 704/2 |
| 2010/0223048 A1* | 9/2010 | Lauder | 704/4 |

OTHER PUBLICATIONS

"Algorithms/Dynamic Programming", http://en.wikibooks.org/wiki/Algorithms/Dynamic_Programming, accessed Jul. 27, 2009, 7 pages.

"Dynamic programming", http://en.wikipedia.org/wiki/Dynamic_programming, accessed Jul. 27, 2009, 12 pages.

Adusumilli, Keerthi K., "Natural Languages Translation Using an Intermediate Language", IAENG International Journal of Computer Science, vol. 33, Issue 1, http://www.iaeng.org/IJCS/issues_v33/issue_1/IJCS_33_1_20.pdf, Feb. 2007, 3 pages.

Gollins, Tim et al., "Improving cross language retrieval with triangulated translation", Annual ACM Conference on Research and Development in Information Retrieval, Proc. of the 24th annual international ACM SIGIR conf. on Research and dev. in info. retrieval, http://portal.acm.org/citation.cfm?id=383965&dl=GUIDE&coll=GU, 2001, 5 pages.

Macherey, Klaus et al., "Applications of Statistical Machine Translation Approaches to Spoken Language Understanding", IEEE Transactions, vol. 17, Issue No. 4, May 2009, 16 pages.

Matusov, Evgeny et al., "System Combination for Machine Translation of Spoken and Written Language", IEEE Transactions, vol. 16, Issue No. 7, Sep. 2008, pp. 1222-1237.

Mitamura, Teruko et al., "An Efficient Interlingua Translation System for Multi-lingual Document Production", Carnegie Mellon University, Jul. 2-4, 1991, 7 pages.

Och, Franz J. et al., "Statistical Multi-Source Translation", RWTH Aachen-University of Technology, German, 2001, 6 pages.

\* cited by examiner

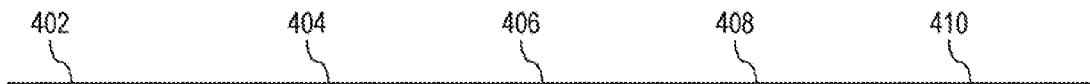

| HUMAN RESOURCE IDENTIFIER | INPUT LANGUAGE/ MEDIA | OUTPUT LANGUAGE/ MEDIA | EXPECTED TRANSLATION ACCURACY | THROUGHPUT (WORDS/ MINUTE) |
|---|---|---|---|---|
| A | ENGLISH AUDIO | ENGLISH CAPTIONING | 75% | 45 |
| A | ENGLISH AUDIO | TAGALOG AUDIO | 95% | 120 |
| A | ENGLISH AUDIO | SPANISH AUDIO | 93% | 100 |
| A | ENGLISH CAPTIONING | TAGALOG CAPTIONING | 90% | 60 |
| A | ENGLISH CAPTIONING | SPANISH CAPTIONING | 88% | 50 |
| B | JAPANESE AUDIO | JAPANESE CAPTIONING | 95% | 115 |
| B | JAPANESE AUDIO | CHECK AND EDIT FOR JAPANESE CAPTIONING | (130%) | 180 |
| B | JAPANESE AUDIO | JAPANESE SIGN LANGUAGE | 85% | 95 |
| B | ENGLISH CAPTIONING | AMERICAN SIGN LANGUAGE | 83% | 80 |

*FIG. 4A*

| AUTOMATIC TRANSLATION SYSTEM IDENTIFIER | INPUT LANGUAGE/ MEDIA | OUTPUT LANGUAGE/ MEDIA | EXPECTED TRANSLATION ACCURACY | THROUGHPUT (WORDS/ MINUTE) |
|---|---|---|---|---|
| 1 | JAPANESE AUDIO | JAPANESE CAPTIONING | 75% | 250 |
| 2 | JAPANESE CAPTIONING | ENGLISH CAPTIONING | 85% | 310 |
| 3 | ENGLISH CAPTIONING | JAPANESE CAPTIONING | 75% | 280 |
| 4 | ENGLISH AUDIO | ENGLISH CAPTIONING | 85% | 330 |
| 5 | SPANISH AUDIO | SPANISH CAPTIONING | 80% | 320 |
| 6 | ENGLISH CAPTIONING | SPANISH CAPTIONING | 80% | 300 |
| 7 | ENGLISH CAPTIONING | AMERICAN SIGN LANGUAGE | 95% | 310 |

*FIG. 4B*

OPTIMIZING A LANGUAGE/MEDIA TRANSLATION MAP

This application is a continuation of application Ser. No. 12/567,162, filed Sep. 25, 2009, status pending.

BACKGROUND

The present application relates generally to an improved data processing apparatus and method and more specifically to an apparatus and method for optimizing multiple language/media translations.

Linguists estimate that there are about 5,000-6,000 different languages used in the world today. The imprecision in this estimate is largely due to the fact that some dialects are in the process of diverging and it is not clear that those languages have reached the stage of being separate languages. Currently, there are about 200 languages that have a million or more native speakers. Due to the rapid increase of globalization and the strong need for accessibility, a vital need has risen to translate the language to the audience's perceivable language for information assurance.

Using automatic speech recognition systems and automatic language translation systems including the Braille system and sign language system, an input language may now be translated into a target language. However, in automatically translating one language into another, a number of points should be taken into consideration, such as:

1) The expected accuracy of such automatic translation systems may not necessarily be high; and
2) The automatic translation systems may not be available for the target language.

Therefore, in addition to providing automatic translation systems, backups or alternatives must be provided for such automatic translation systems, such as human resource translators or error correction for the automatic translation systems. However, while human resource translators may be able to produce translated results in high accuracy, the throughput or parallelism is usually very limited.

SUMMARY

In one illustrative embodiment, a method, in a data processing system, is provided for optimizing a language/media translation map. The illustrative embodiment receives user input comprising an input language/media selection, one or more output languages/medias selections, and a threshold for at least one of accuracy or throughput of one or more requested language/media translations. For each of the one or more requested language media translations, the illustrative embodiment determines whether an accuracy or throughput of a selected one of an automated translation system or a human resource translator is above the threshold for the at least one of accuracy or throughput. Responsive to the accuracy or throughput of the selected one of the automated translation system or the human resource translator being above the threshold for the at least one of accuracy or throughput, the illustrative embodiment adds either the selected one of the automated translation system or the selected one of the human resource translator to a multiple language/media translation map. The illustrative embodiment generates an optimized multiple language/media translation map for use by a translation orchestration module in the data processing system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4A depicts the language and media translations that may be performed by various human resource translators in accordance with an illustrative embodiment;

FIG. 4B depicts the language and media translations that may be performed by various automatic translation systems in accordance with an illustrative embodiment;

DETAILED DESCRIPTION

The illustrative embodiments provide a mechanism for providing an optimized map for translating an input language/media to multiple target languages/medias. A mechanism is provided that optimally distributes translation work to automatic translation systems, which may have limits to translation accuracy and availability, and/or to human resources, which may have a high accuracy but may be limited in throughput. The illustrative embodiments provide an optimization translation map by taking into consideration the expected confidence score, throughput, and availability of automatic translation systems and human resource translators.

Figure 1:
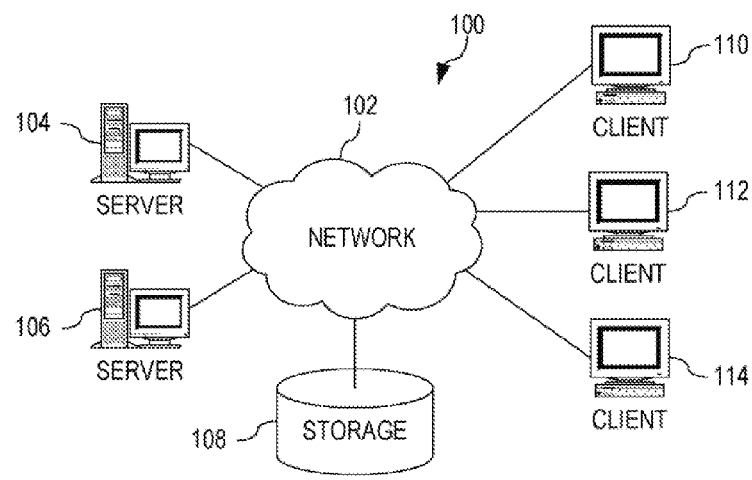
FIG. 1 depicts a pictorial representation of an example distributed data processing system in which aspects of the illustrative embodiments may be implemented.
Figure 2:
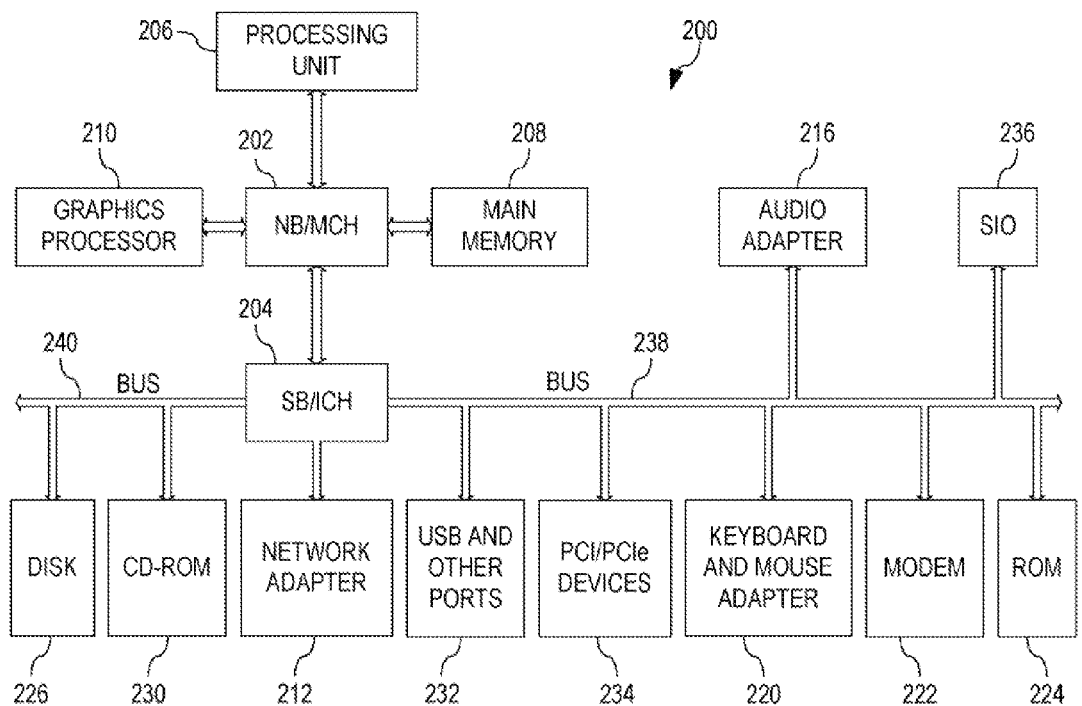
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a multiple language/media translation optimization mechanism, this is only an example and is not intended to state or imply any limitation with regard to the features of the present invention. To the contrary, the illustrative embodiments are intended to include distributed data processing environments and embodiments in which an optimized map is provided for translating one input language/media into multiple target languages/medias.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

A multiple language/media translation optimization mechanism provides for translating an input language in one media, such as audio, text, video, or the like, into multiple target languages in either the same media as the input language or a different media. Automatic translation systems, such as automatic language translation systems, automatic speech recognition systems, or the like, may be cost effective but the supported combination of languages are very much limited for example, English to Tagalog language/media translation systems may not exist. Also, the expected translation accuracy of such automatic translation systems may vary. For example, automatic speech recognition may not be able to transcribe audio with high accuracy depending on the language/media. On the other hand, translation by human resource translators may have an expected high accuracy but, since human resource translators normally may only perform one task at a time, the throughput or parallel processing of human resource translators may be limited. In addition, when there are more layers of translation, the expected accuracy may be lowered by each layer. Especially in cases where the translation accuracy is low in the upper layer of the stream, the accuracy of the lower layers of that layer decreases considerably. Taking such effects in consideration, the optimal translation map provided by the multiple language/media translation optimization mechanism of the illustrative embodiments may be extremely valuable.

Figure 3:
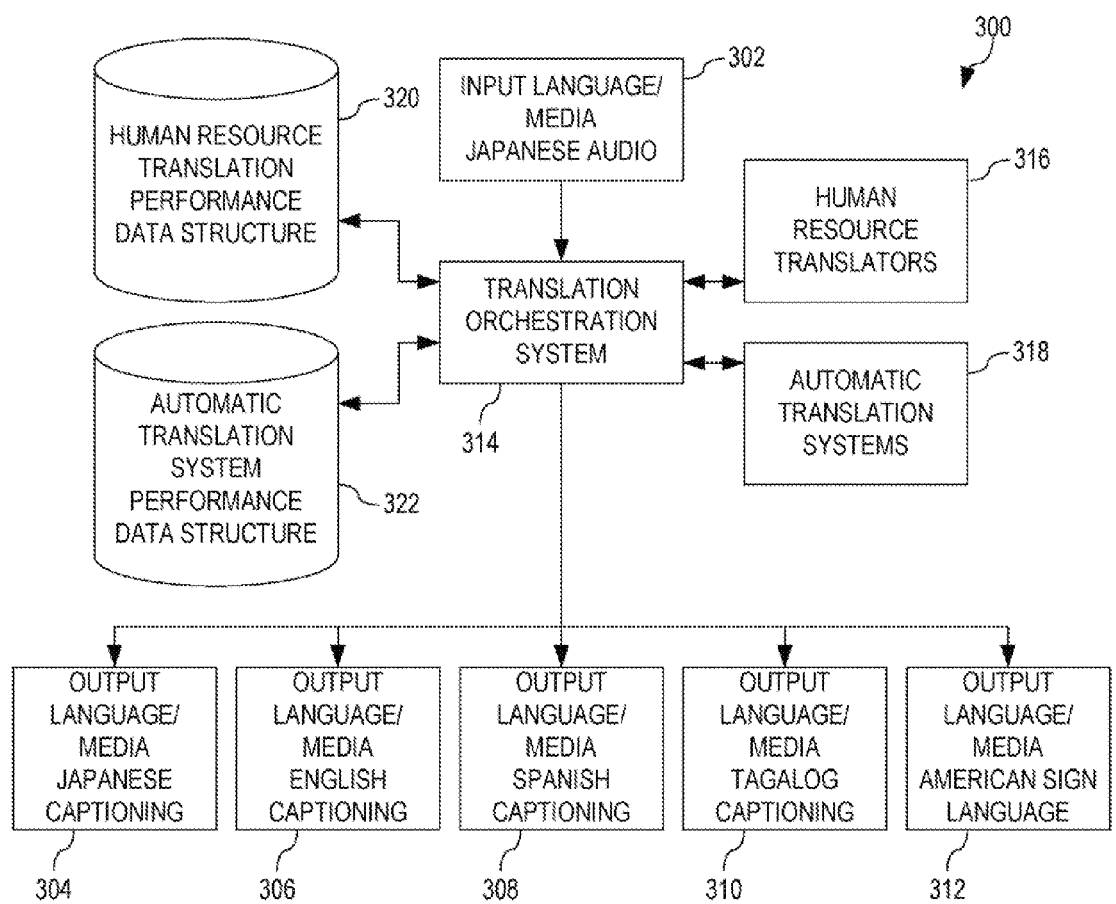
FIG. 3 depicts an example of a language/media translation from one input language/media to one or more output languages/medias in accordance with an illustrative embodiment.

FIG. 3 depicts an example of a language/media translation from one input language/media to one or more output languages/medias in accordance with an illustrative embodiment. In exemplary language/media translation 300, input language/media 302 is Japanese and is an audio media type. Input language/media 302 is being translated to output languages/medias 304, 306, 308, 310, and 312, which are Japanese in a captioning media, English in a captioning media, Spanish in a captioning media, Tagalog in a captioning media, and American sign language, respectively.

In this example, translation orchestration system 314 uses information about human resource translators 316 and automatic translation systems 318 to select either a human resource translator or automatic translation system to one or more of the required translations. The information about human resource translators 316 and automatic translation systems 318 is stored in human resource translation performance data structure 320 and automatic translation system performance data structure 322. An example of the information stored in human resource translation performance data structure 320 and automatic translation system performance data structure 322 is depicted in FIGS. 4A and 4B, respectively, in accordance with an illustrative embodiment.

FIG. 4A depicts the language and media translations that may be performed by various human resource translators in accordance with an illustrative embodiment. Each human resource translator is identified by a human resource identifier 402, along with the various input language/media 404 to output language/media 406 translations that the human translator may perform. Additionally, for each input language/media 404 to output language/media 406 translation is an associated expected translation accuracy 408 and throughput 410 in terms of words per minute.

FIG. 4B depicts the language and media translations that may be performed by various automatic translation systems in accordance with an illustrative embodiment. Each automatic translation system is identified by an automatic translation system identifier 412, along with the input language/media 414 to output language/media 416 translation that the automatic translation system may perform. Additionally, for each automatic translation system is an associated expected translation accuracy 418 and throughput 420 in terms of words per minute.

Figure 5:
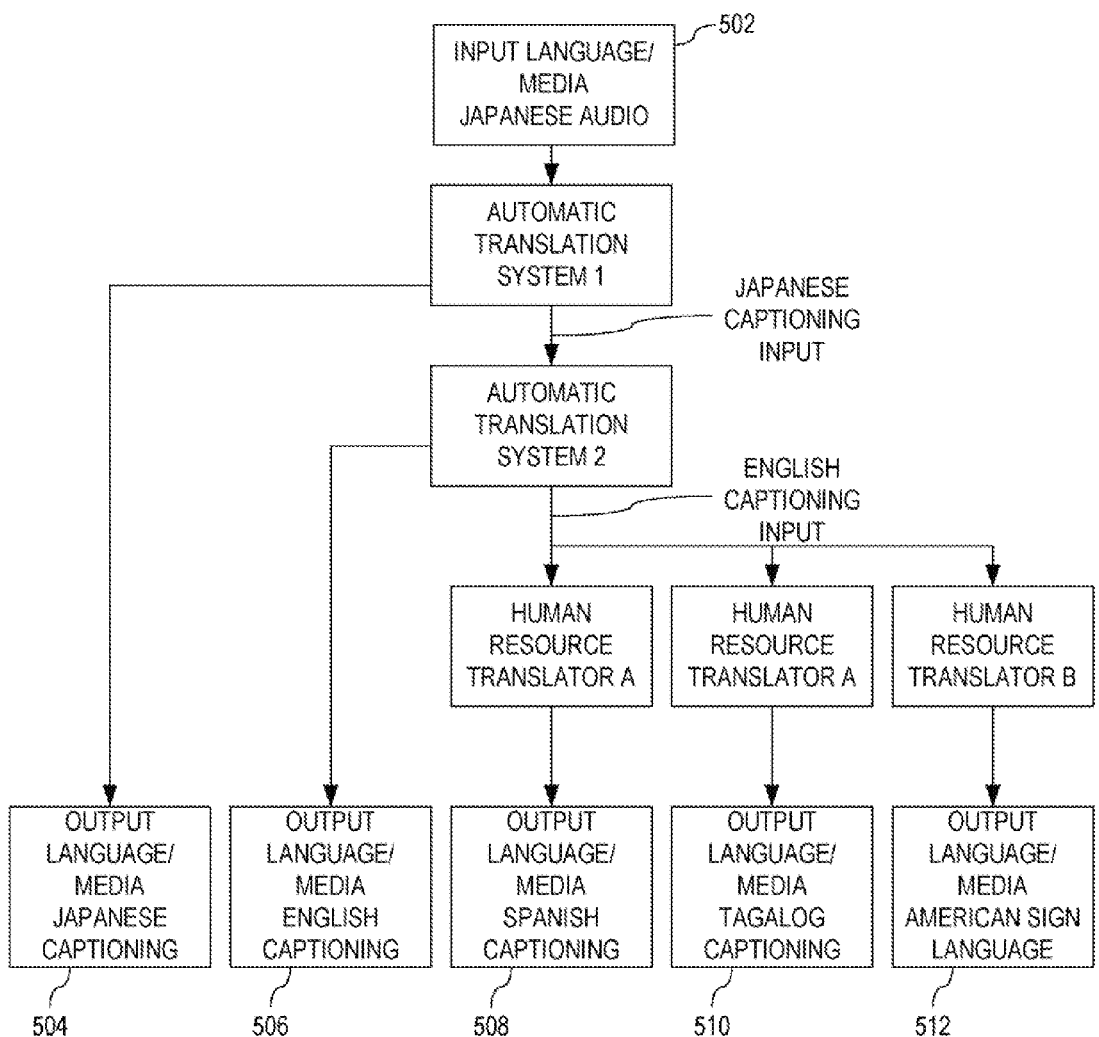
FIG. 5 depicts a non-optimized example of a language/media translation that includes one or more intermediate translations in accordance with an illustrative embodiment.

Returning to FIG. 3, in selecting either a human resource translator or automatic translation system to perform each of the required translations, translation orchestration system 314 may determine there is no direct translation from input language/media 302 to one or more of output languages/medias 304, 306, 308, 310, and 312. Thus, an intermediate translation must be performed in order to perform all of required translations. FIG. 5 depicts a non-optimized example of a language/media translation that includes one or more intermediate translations in accordance with an illustrative embodiment. Using the requested language/media translations of FIG. 3 and the human resource translation information and the automatic translation system information of FIGS. 4A and 4B, the translation orchestration system determines that there is no direct translation from input language/media 502 to output languages/medias 506, 508, 510, and 512. Therefore, the translation orchestration system may determine whether to perform one or more intermediate translations.

In this example, the translation orchestration system may determine that a first translation that translates input language/media 502, which is Japanese audio, to Japanese captioning using automatic translation system 1. However, performing this first intermediate translation still fails to provide a way for the translation orchestration system to produce output languages/medias 508, 510, and 512. Thus, the translation orchestration system may determine that a second intermediate translation from Japanese captioning to English captioning using automatic translation system 2 is required in order to produce translations for each of output languages/ medias 508, 510, and 512. With these two intermediate translations, human resource translator A may produce output languages/medias 508 and 510 and human resource translator B may produce output language/media 512.

As a result, each of output languages/medias 504, 506, 508, 510, and 512 have been produced. However, output language/media 504 is produced with a 75% accuracy with a throughput of 250 words per minute, output language/media 506 is produced with a 63.75% accuracy with a throughput of 250 words per minute, output language/media 508 is produced with a 56.1% accuracy with a throughput of 50 words per minute, output language/media 510 is produced with a 57.38% accuracy with a throughput of 60 words per minute, and output language/media 512 is produced with a 52.91% accuracy with a throughput of 80 words per minute. Additionally, output languages/medias 508 and 510 may further be reduced in words per minute because human resource translator A is selected to produce both languages/medias.

Figure 6:
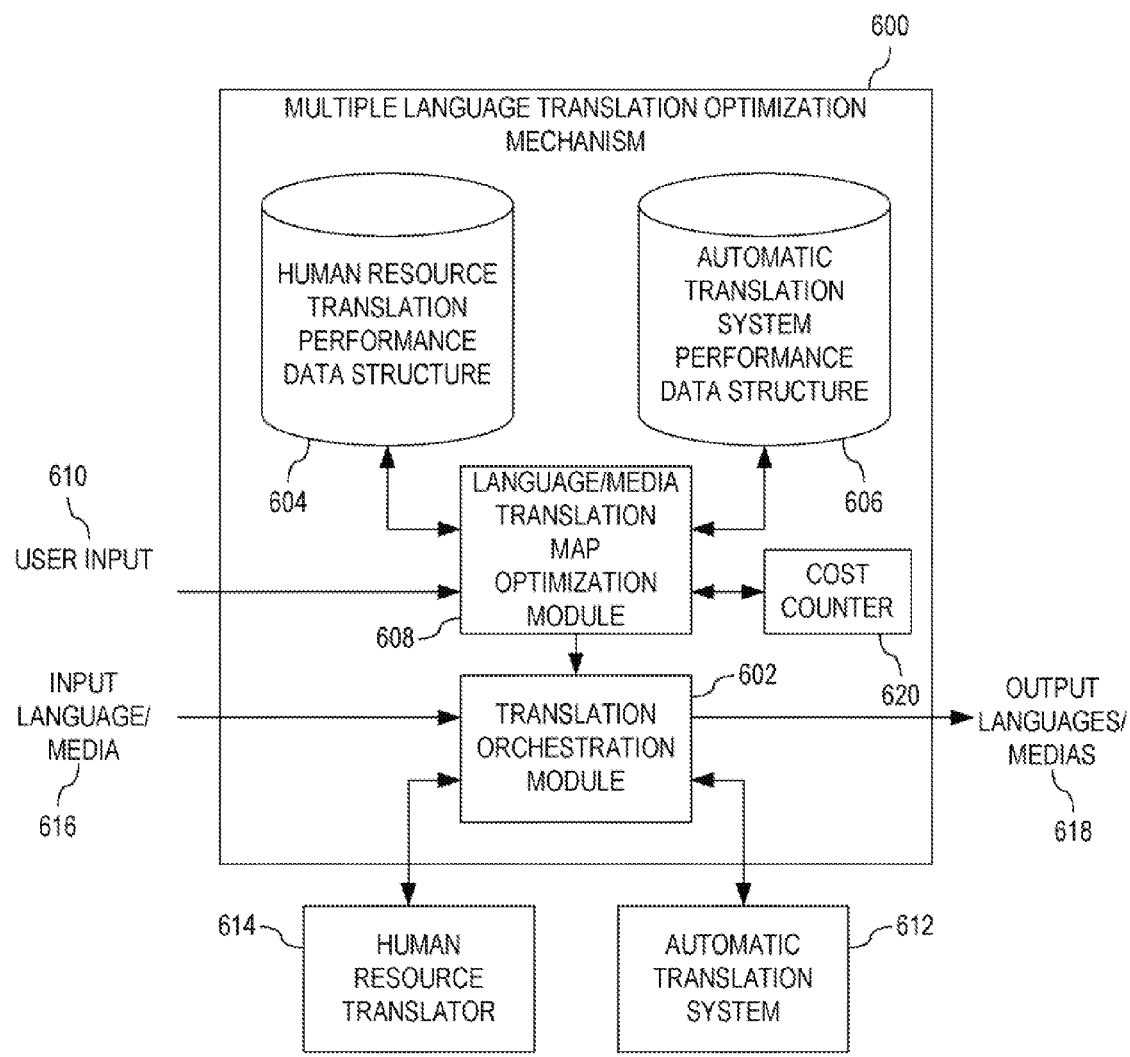
FIG. 6 depicts an example of a multiple language/media translation optimization mechanism in accordance with an illustrative embodiment.

FIG. 6 depicts an example of a multiple language/media translation optimization mechanism in accordance with an illustrative embodiment. Multiple language/media translation optimization mechanism 600 comprises translation orchestration module 602, human resource translation performance data structure 604, and automatic translation system performance data structure 606 similar to the associated components shown in FIG. 3. In addition, multiple language/media translation optimization mechanism 600 also comprises language/media translation map optimization module 608. Language/media translation map optimization module 608 receives user input 610 that indicates an input language/media selection, one or more output languages/medias, and a threshold for the accuracy and/or throughput of the requested translation. Once language/media translation map optimization module 608 receives the input, language/media translation map optimization module 608 identifies all of the automated translation systems and/or human resource translators that are capable of performing each translation for the requested output languages/medias based on the input language/media using the information residing in human resource translation performance data structure 604 and automatic translation system performance data structure 606.

Based on the identified automated translation systems and human resource translators, language/media translation map optimization module 608 determines whether each requested language/media translation may be performed directly. If the requested language/media translation cannot be performed directly based on a automated translation system or human resource translator being unavailable, language/media translation map optimization module 608 determines whether there is one or more intermediate translations that may be performed in order to achieve the requested language/media translation. If language/media translation map optimization module 608 identifies one or more intermediate translations that may be performed, language/media translation map optimization module 608 selects the one or more intermediate translation for the language/media translation being performed and replaces the initial input language/media with the resulting language/media of the intermediate translation. If language/media translation map optimization module 608 fails to identify one or more intermediate translations that may be performed, language/media translation map optimization module 608 reports an error to the requestor of the requested language/media translation.

Whether the requested language/media translations are performed directly or with the use of an intermediate translation, language/media translation map optimization module 608 then selects a set of automatic translation systems and/or human resource translators to perform the requested language/media translation. Based on the identification, language/media translation map optimization module 608 determines whether the accuracy and throughput of the selected set of automated translation systems and/or human resource translators is above the predefined threshold for the accuracy and/or throughput of the requested translation. If the accuracy and throughput of the selected set of automated translation systems and/or human resource translators is above the predefined threshold for the accuracy and/or throughput of the requested translation, then language/media translation map optimization module 608 adds the set of selected automated translation systems and/or human resource translators to a multiple language/media translation map.

If the accuracy and throughput of the selected set of automated translation systems and/or human resource translators fails to be above the predefined threshold for the accuracy and/or throughput of the requested translation, then language/media translation map optimization module 608 determines whether there is one or more intermediate translation that will improve the accuracy and throughput for the requested language/media translation. If language/media translation map optimization module 608 identifies one or more intermediate translations that may be performed, language/media translation map optimization module 608 selects the one or more intermediate translations for the language/media translation being performed and replaces the initial input language/media with the resulting language/media of the intermediate translation. If language/media translation map optimization module 608 fails to identify one or more intermediate translations that may be performed, then language/media translation map optimization module 608 adds the set of identified automated translation systems and/or human resource translators to a multiple language/media translation map and notes the exception to the requestor of the language/media translation.

Prior to adding the set of selected automated translation systems and/or human resource translators to a multiple language/media translation map, language/media translation map optimization module 608 may also determine whether a human resource has been assigned to multiple translations. If a human resource translator has not been assigned multiple translations, then the language/media translation map optimization module 608 proceeds with adding the set of selected automated translation systems and/or human resource translators to a multiple language/media translation map. If a human resource translator has been assigned multiple translations, then language/media translation map optimization module 608 may determine whether there is another human resource translator or automatic translation system that may perform one of the multiple assigned translations with an accuracy and/or throughput above the predefined threshold. If there is another human resource translator or automatic translation system that can perform one of the multiple assigned translations with an accuracy and/or throughput above the predefined threshold, then language/media translation map optimization module 608 selects the other human resource translator or automatic translation system to perform the translation. If there is no other human resource translator or automatic translation system that can perform one of the multiple assigned translations with an accuracy and/or throughput above the predefined threshold, then language/media translation map optimization module 608 uses the originally identified human resource translator to perform the multiple assigned translations.

Once all of the requested language/media translations have been processed, language/media translation map optimization module 608 increments cost counter 620 by a predefined cost associated with each automatic translation system or human resource translator for each selected automatic translation system or human resource translator. While the illustrative embodiments describe language/media translation map optimization module 608 incrementing cost counter 620 after all the requested language/media translations have been processed, the illustrative embodiments recognize that language/media translation map optimization module 608 may increment cost counter 620 as each requested language/media translation is processed. Once all costs have been added to cost counter 620, language/media translation map optimization module 608 may determine if the value of the cost counter exceeds a predefined budget for the entire requested language/media translation. If the value of the cost counter exceeds the predefined budget, then language/media translation map optimization module 608 sends a notification of the surpass to the requestor of the requested language/media translation. If the value of the cost counter fails to exceed the predefined budget, then language/media translation map optimization module 608 generates an optimized multiple language/media translation map and sends the optimized multiple language/media translation map to translation orchestration module 602. Translation orchestration module 602 uses the identified set of automated translation systems 612 and/or human resource translators 614 for each language/media to perform the requested translations from input language/media 616 to output languages/medias 618.

Figure 7:
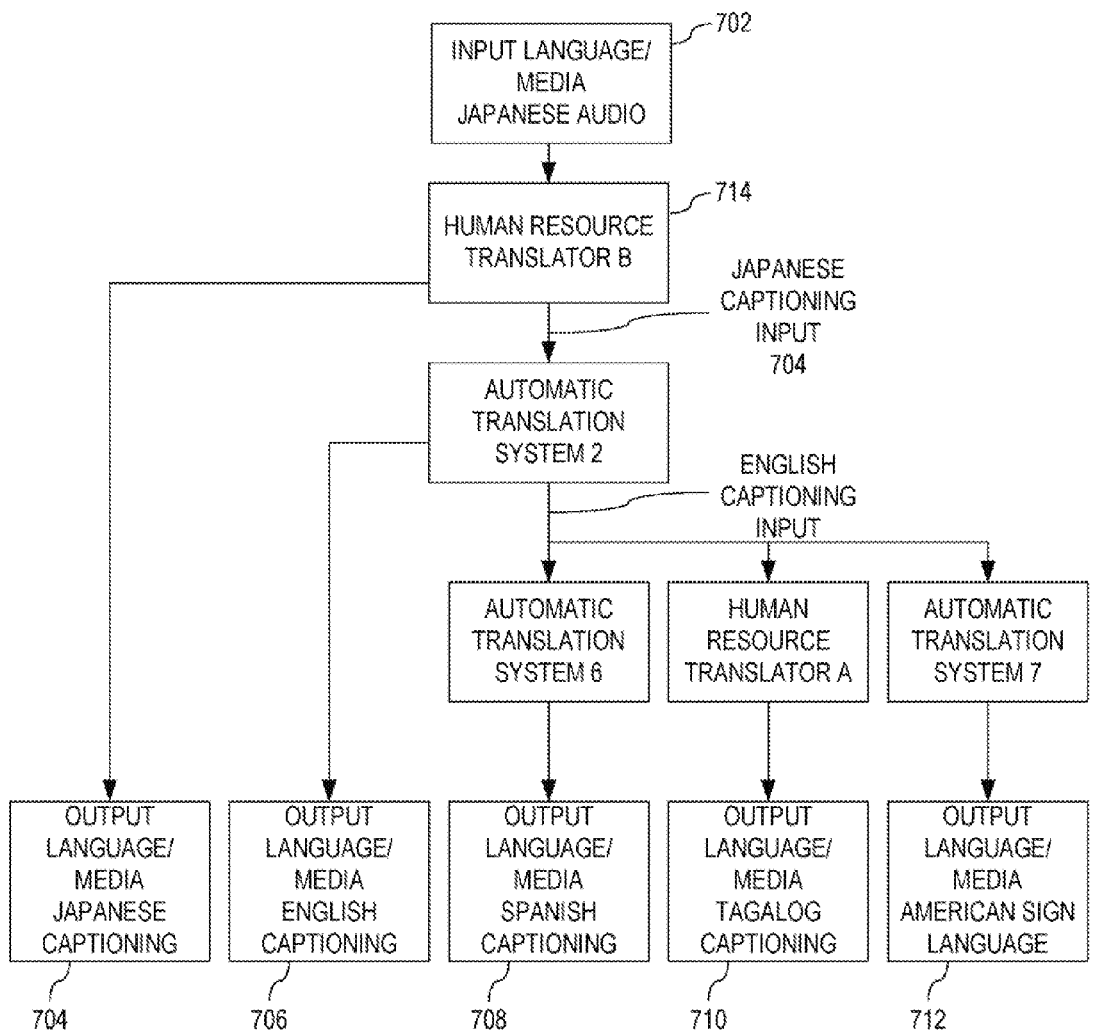
FIG. 7 depicts an optimized example of a language/media translation in accordance with an illustrative embodiment.

FIG. 7 depicts an optimized example of a language/media translation in accordance with an illustrative embodiment. Using the requested language/media translations of FIG. 3 and the human resource translation information and the automatic translation system information of FIGS. 4A and 4B, a language/media translation map optimization module such as language/media translation map optimization module 608 of FIG. 6 determines that there is no direct translation from input language/media 702 to output languages/medias 706, 708, 710, and 712. Therefore, the language/media translation map optimization module may determine to perform one or more intermediate translations.

However, as opposed to the map generated in FIG. 5, the language/media translation map optimization module may determine translating input language/media 702, which is Japanese audio, to Japanese captioning using automatic translation system 1 shown in FIG. 5 is below the predefined threshold for the accuracy and/or throughput. Thus, another selection may be to use human resource translator B 714, which may translate the Japanese audio to Japanese captioning 704 at a throughput of 180 words per minute opposed to the throughput of automatic translation system 1 that has a throughput of 250 words per minute, but the accuracy of human resource translator B is 130% as opposed to the accuracy of automatic translation system 1, which is 75%. The reason that the expected translation accuracy of human resource translator B exceeds 100% is because human resource translator B is expected to increase the accuracy of the one above layer by listening to the Japanese input audio and by inspecting the output captioning to check if the captioning is correct and if not, makes corrections to important words such as keywords. In actuality, the output of human resource translator B may not exceed 100% accuracy, but an improvement due to checking and editing is realized, therefore the information is posted as a number greater than 100%.

However, performing this first intermediate translation still fails to provide a way for the translation orchestration system to produce output languages/medias 708, 710, and 712. Thus, the language/media translation map optimization module may determine that a second intermediate translation from Japanese captioning to English captioning using automatic translation system 2 is required in order to produce translations for each of output languages/medias 708, 710, and 712. With the increase in accuracy provided by human resource translator B, the language/media translation map optimization module may then determine that in order to regain throughput, output languages/medias 708 and 712 may be produced differently. Language/media translation map optimization module selects automatic translation system 6 to produce output language/media 708, which has 8% less accuracy than human resource translator A but has a higher throughput of 250 words per minute above human resource translator A. Language/media translation map optimization module selects automatic translation system 7 to produce output language/media 712, which has 12% more accuracy than human resource translator B and has a higher throughput of 230 words per minute above human resource translator B. Language/media translation map optimization module selects human resource translator A to produce output language/media 710.

As a result, each of output languages/medias 704, 706, 708, 710, and 712 have been produced. Output language/media 704 is produced with a 100% accuracy with a throughput of 180 words per minute, output language/media 706 is produced with a 85% accuracy with a throughput of 180 words per minute, output language/media 708 is produced with a 68% accuracy with a throughput of 180 words per minute, output language/media 710 is produced with a 76.5% accuracy with a throughput of 60 words per minute, and output language/media 712 is produced with a 80.75% accuracy with a throughput of 180 words per minute. Additionally, none of output languages/medias 704, 706, 708, 710, and 712 are reduced in words per minute because either an automatic translation system or human resource translator is producing tow or more languages/medias.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 8A:
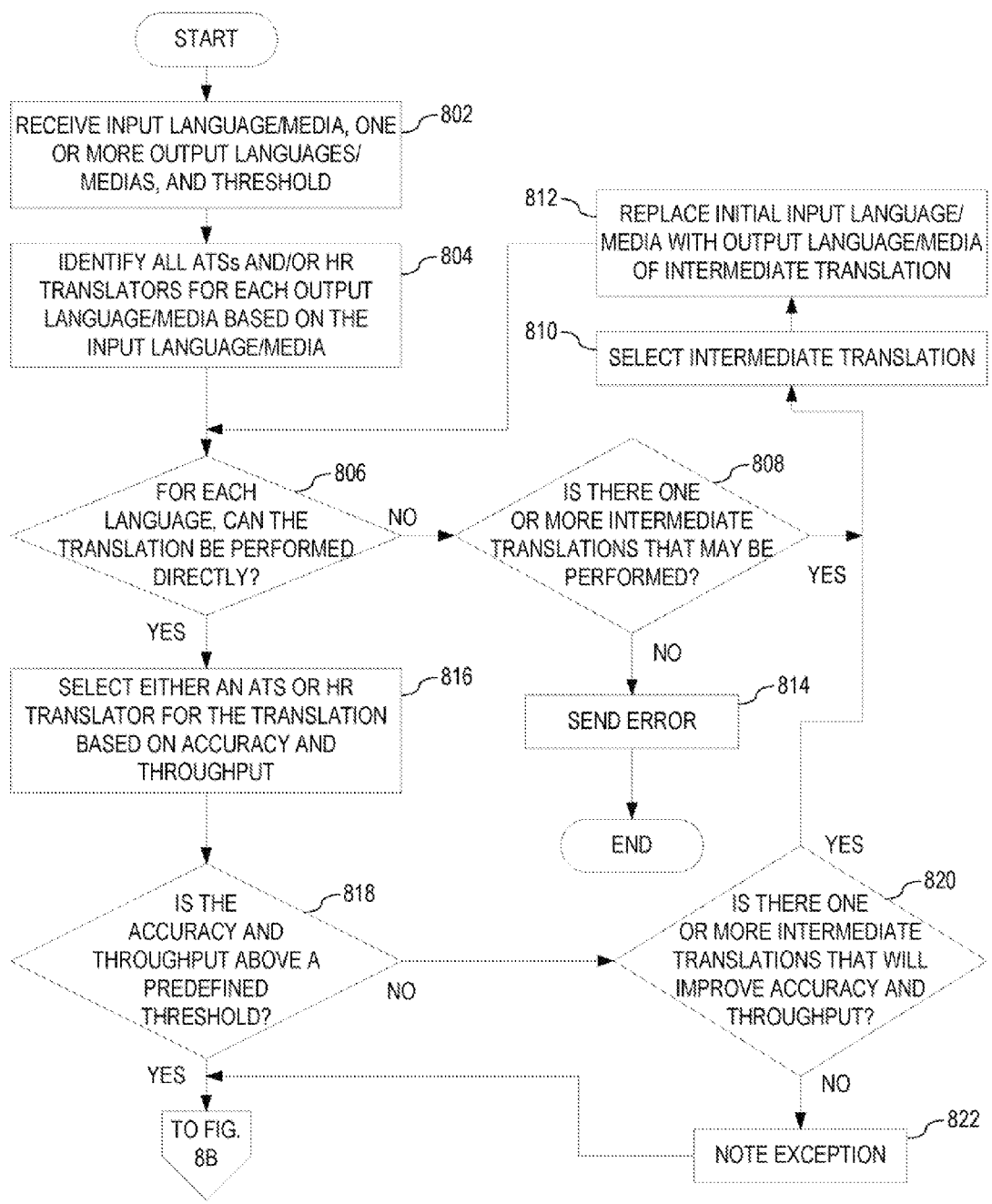
FIGS. 8A and 8B provide a flowchart outlining example operations of a language/media translation map optimization module in accordance with an illustrative embodiment.
Figure 8B:
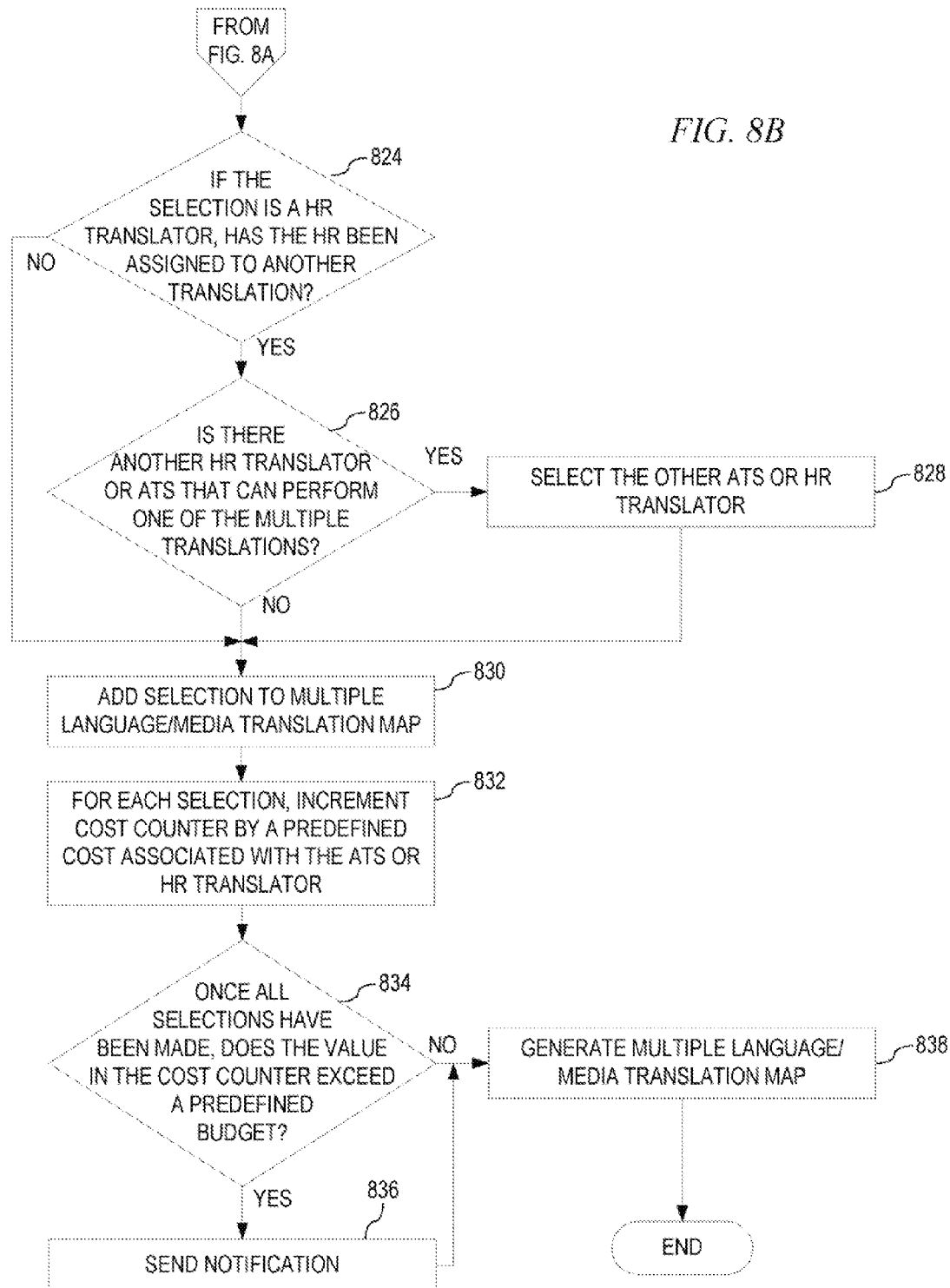

Referring now to FIGS. 8A and 8B, these figures provide a flowchart outlining example operations of a language/media translation map optimization module in accordance with an illustrative embodiment. As the operation begins, a language/media translation map optimization module receives user input that indicates an input language/media selection, one or more output languages/medias selections, and a threshold for the accuracy and/or throughput of the requested translation (step 802). Once the language/media translation map optimization module receives the input, language/media translation map optimization module identifies all of the automated translation systems and/or human resource translators that are capable of performing each translation for the requested output languages/medias based on the input language/media (step 804). The language/media translation map optimization module identifies all of the automated translation systems and/or human resource translators capable of performing each translation using information residing in a human resource translation performance data structure and an automatic translation system performance data structure.

Based on the identified automated translation systems and human resource translators, the language/media translation map optimization module determines whether each requested language/media translation may be performed directly (step 806). If at step 806 the requested language/media translation cannot be performed directly based on an automated translation system or human resource translator being unavailable, the language/media translation map optimization module determines whether there is one or more intermediate translations that may be performed in order to achieve the requested language/media translation (step 808). If at step 808 the language/media translation map optimization module identifies one or more intermediate translations that may be performed, the language/media translation map optimization module selects the one or more intermediate translation for the language/media translation being performed (step 810). The language/media translation map optimization module then replaces the initial input language/media with the resulting output language/media of the intermediate translation (step 812), with the operation returning to step 806 thereafter. If at step 808 the language/media translation map optimization module fails to identify one or more intermediate translations that may be performed, the language/media translation map optimization module reports an error to the requestor of the requested language/media translation (step 814), with the operation terminating thereafter.

If at step 806 the requested language/media translation can be performed directly or with the use of an intermediate translation, the language/media translation map optimization module then selects a set of automatic translation systems and/or human resource translators to perform the requested language/media translation (step 816). Based on the identification, the language/media translation map optimization module determines whether the accuracy and throughput of the identified set of automated translation systems and/or human resource translators is above the predefined threshold for the accuracy and/or throughput of the requested translation (step 818).

If at step 818 the accuracy and throughput of the identified set of automated translation systems and/or human resource translators fails to be above the predefined threshold for the accuracy and/or throughput of the requested translation, then the language/media translation map optimization module determines whether there is one or more intermediate translation that will improve the accuracy and throughput for the requested language/media translation (step 820). If at step 820 the language/media translation map optimization module identifies one or more intermediate translations that may be performed, the language/media translation map optimization module selects the one or more intermediate translation for the language/media translation being performed (step 810). Then the language/media translation map optimization module replaces the initial input language/media with the resulting output language/media of the intermediate translation (step 812), with the operation returning to step 806 thereafter. If at step 820 the language/media translation map optimization module fails to identify one or more intermediate translations that may be performed, then the language/media translation map optimization module notes the exception to the requestor of the language/media translation (step 822).

From step 822 or if at step 818 the accuracy and throughput of the identified set of automated translation systems and/or human resource translators is above the predefined threshold for the accuracy and/or throughput of the requested translation, the language/media translation map optimization module determines whether a human resource has been assigned to multiple translations (step 824). If at step 824 a human resource translator has been assigned multiple translations, then the language/media translation map optimization module determines whether there is another human resource translator or automatic translation system to perform one of the multiple assigned translations with an accuracy and/or throughput above the predefined threshold (step 826). If at step 826 there is another human resource translator or automatic translation system that can perform one of the multiple assigned translations with an accuracy and/or throughput above the predefined threshold, then the language/media translation map optimization module selects the other human resource translator or automatic translation system to perform the translation (step 828).

From step 828 or if at step 824 a human resource translator has not been assigned multiple translations or if at step 826 there is no other human resource translator or automatic translation system that can perform one of the multiple assigned translations with an accuracy and/or throughput above the predefined threshold, then the language/media translation map optimization module proceeds with adding the set of selected automated translation systems and/or human resource translators to a multiple language/media translation map (step 830). Once all of the requested language/media translations have been processed, the language/media translation map optimization module increments a cost counter by a predefined cost associated with each automatic translation system or human resource translator for each selected automatic translation system or human resource translator (step 832). Once all costs have been added to the cost counter, the language/media translation map optimization module determines whether the value of the cost counter exceeds a predefined budget for the entire requested language/media translation (step 834). If at step 834 the value of the cost counter exceeds the predefined budget, then the language/media translation map optimization module sends a notification of the surpass to the requestor of the requested language/media translation (step 836). From step 836 or if at step 834 the value of the cost counter fails to exceed the predefined budget, the language/media translation map optimization module generates an optimized multiple language/media translation map (step 838) and sends the optimized multiple language/media translation map to a translation orchestration module with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for providing an optimized map for translating an input language/media to multiple target languages/medias. The mechanisms optimally distribute translation work to automatic translation systems, which may have limits to translation accuracy and availability, and/or to human resources, which may have a high accuracy but may be limited in throughput. The illustrative embodiments provide an optimization translation map by taking into consideration the expected confidence score, throughput, and availability of automatic translation systems and human resource translators.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing a language/media translation map, the method comprising:

receiving, by a language/media translation map optimization module of the data processing system, user input comprising an input language/media selection, one or more output languages/medias selections, and a threshold for at least one of accuracy or throughput of one or more requested language/media translations;

for each of the one or more requested language media translations, determining, by the language/media translation map optimization module, whether an accuracy or throughput of a selected one of an automated translation system or a human resource translator is above the threshold for the at least one of accuracy or throughput;

responsive to the accuracy or throughput of the selected one of the automated translation system or the human resource translator being above the threshold for the at least one of accuracy or throughput, adding, by the language/media translation map optimization module, either the selected one of the automated translation system or the selected one of the human resource translator to a multiple language/media translation map;

generating, by the language/media translation map optimization module, an optimized multiple language/media translation map utilized by a translation orchestration module in the data processing system;

determining by the language/media translation map optimization module, whether a selected human resource translator has been assigned to more than one of the one or more requested language/media translations;

responsive to the selected human resource translator being assigned more than one translation, determining, by the language/media translation map optimization module, whether there is another human resource translator or another automatic translation system to perform one of the more than one assigned translations with an accuracy and/or throughput above the predefined threshold;

responsive to the existence of the another human resource translator or automatic translation system to perform one of the more than one assigned translations with an accuracy and/or throughput above the predefined threshold, selecting, by the language/media translation map optimization module, either the other human resource translator or the other automatic translation system to perform the translation; and adding, by the language/media translation map optimization module, either the other automated translation system or the other human resource translator to perform the one or more intermediate translations to the multiple language/media translation map.

2. The method of claim 1, further comprising:
for each of the one or more requested language media translations, determining, by the language/media translation map optimization module, whether each requested language/media translation of the one or more requested language media translations may be performed directly;

responsive to a failure to perform the requested language/media translation directly, determining, by the language/media translation map optimization module, whether one or more intermediate translations may be performed in order to achieve the requested language/media translation;

responsive to identifying one intermediate translation to be performed, selecting, by the language/media translation map optimization module, the one intermediate translation for the requested language/media translation, thereby forming two required translations to produce the requested language/media translation;

for a first translation of the two required translations, replacing, by the language/media translation map optimization module, the one or more output language/media selections with a language/media of the one intermediate translation;

for a second of the two required translations, replacing, by the language/media translation map optimization module, the input language/media with the language/media of the one intermediate translation; and adding, by the language/media translation map optimization module, either the selected one of the automated translation system or the selected one of the human resource translator to perform each of the two required translations to the multiple language/media translation map.

3. The method of claim 2, further comprising;
responsive to a failure to identity one or more intermediate translations that may be performed, sending, by the language/media translation map optimization module, an error to a user.

4. The method of claim 1, further comprising:
responsive to the accuracy or throughput of the selected one of the automated translation system or the human resource translator being below the threshold for the at least one of accuracy or throughput, determining, by the language/media translation map optimization module, whether one or more intermediate translations may be performed in order to achieve each of the one or more requested language/media translations;

responsive to identifying one intermediate translation to be performed, selecting, by the language/media translation map optimization module, the one intermediate translation for the requested language/media translations, thereby forming two required translations to produce the requested language/media translations;

for a first translation of the two required translations, replacing, by the language/media translation map optimization module, the one or more output language/media selections with a language/media of the one intermediate translation;

for a second of the two required translations, replacing, by the language/media translation map optimization module, the input language/media with the language/media of the one intermediate translation; and adding, by the language/media translation map optimization module, either the selected one of the automated translation system or the selected one of the human resource translator to perform each of the two required translations to the multiple language/media translation map.

5. The method of claim 4, further comprising:
responsive to a failure to identify one or more intermediate translations that may be performed, noting, by the language/media translation map optimization module, an exception to a user; and adding, by the language/media translation map optimization module, either the automated translation system or the human resource translator to the multiple language/media translation map.

6. The method of claim 1, further comprising:
responsive to a failure to identify another human resource translator or automatic translation system to perform one of the more than one assigned translations with an accuracy and/or throughput above the predefined threshold, adding, by the language/media translation map optimization module, either the selected one of the automated translation system or the selected one of the human resource translator to perform the one or more intermediate translations to the multiple language/media translation map.

7. The method of claim 1, further comprising:

incrementing for each of the one or more requested language/media translations, by the language/media translation map optimization module, a cost counter by predefined cost associated with each of the selected one of the automatic translation system, the selected one of the human resource translator, the other automated translation system, or the other human resource translator;

responsive to all costs for each of the one or more requested language/media translations being added to the cost counter, determining, by the language/media translation map optimization module, whether a value of the cost counter exceeds a predefined budget for the one or more requested language/media translations; and responsive to the value of the cost counter exceeding the predefined budget, sending, by the language/media translation map optimization module, a notification of a surpass to a requestor of the one or more requested language/media translations.

* * * * *